United States Patent
Sugimoto et al.

(10) Patent No.: US 9,639,247 B2
(45) Date of Patent: May 2, 2017

(54) INFORMATION PROCESSING DEVICE, INFORMATION PROCESSING METHOD, AND COMPUTER-READABLE MEDIUM

(71) Applicant: FUJI XEROX Co., Ltd., Minato-kuu, Tokyo (JP)

(72) Inventors: Hideaki Sugimoto, Kanagawa (JP); Nozomi Noguchi, Kanagawa (JP); Shinichi Nakamura, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 376 days.

(21) Appl. No.: 14/189,503

(22) Filed: Feb. 25, 2014

(65) Prior Publication Data
US 2015/0026633 A1 Jan. 22, 2015

(30) Foreign Application Priority Data

Jul. 19, 2013 (JP) .................................. 2013-150805
Nov. 19, 2013 (JP) .................................. 2013-238671

(51) Int. Cl.
*G06F 3/048* (2013.01)
*G06F 3/0484* (2013.01)
*G06F 3/0481* (2013.01)
*G06F 3/0482* (2013.01)
*G06F 3/0483* (2013.01)
*G06F 21/00* (2013.01)
*G06F 21/60* (2013.01)
*G06F 21/84* (2013.01)

(52) U.S. Cl.
CPC .......... *G06F 3/0484* (2013.01); *G06F 3/0481* (2013.01); *G06F 3/0482* (2013.01); *G06F 3/0483* (2013.01); *G06F 3/04842* (2013.01); *G06F 21/00* (2013.01); *G06F 21/608* (2013.01); *G06F 21/84* (2013.01)

(58) Field of Classification Search
CPC ...................................................... G06F 3/0481
USPC ........................................................ 715/778
See application file for complete search history.

(56) References Cited

U.S. PATENT DOCUMENTS

| 7,057,747 B1 | 6/2006 | Minagawa |
| 7,797,642 B1 * | 9/2010 | Karam ................. G06Q 10/107 345/419 |
| 2013/0275509 A1 * | 10/2013 | Micucci .................. H04L 67/02 709/204 |

FOREIGN PATENT DOCUMENTS

JP 2000-222159 A 8/2000

OTHER PUBLICATIONS

"Hands On: Multiple Users, Lock Screen Widgets Round Out Android 4.2." available online at http://arstechnica.com/gadgets/2012/11/hands-on-multiple-users-lock-screen-widgets-round-out-android-4-2/, Nov. 14, 2012, hereinafter "Android".*
Wii U Operations Manual, p. 33, 2012, hereinafter "Wii".*

* cited by examiner

*Primary Examiner* — Matthew Ell
(74) *Attorney, Agent, or Firm* — Sughrue Mion, PLLC

(57) ABSTRACT

An information processing device includes a first output unit and a second output unit. The first output unit displays a start screen including a first image for giving an instruction for switching to a screen corresponding to a user, and a second image for giving an instruction for switching to an edit screen. If the second image is selected, the second output unit outputs an edit screen including, in the same arrangement as the first image, a third image for switching to a screen for editing the screen corresponding to a user.

18 Claims, 14 Drawing Sheets

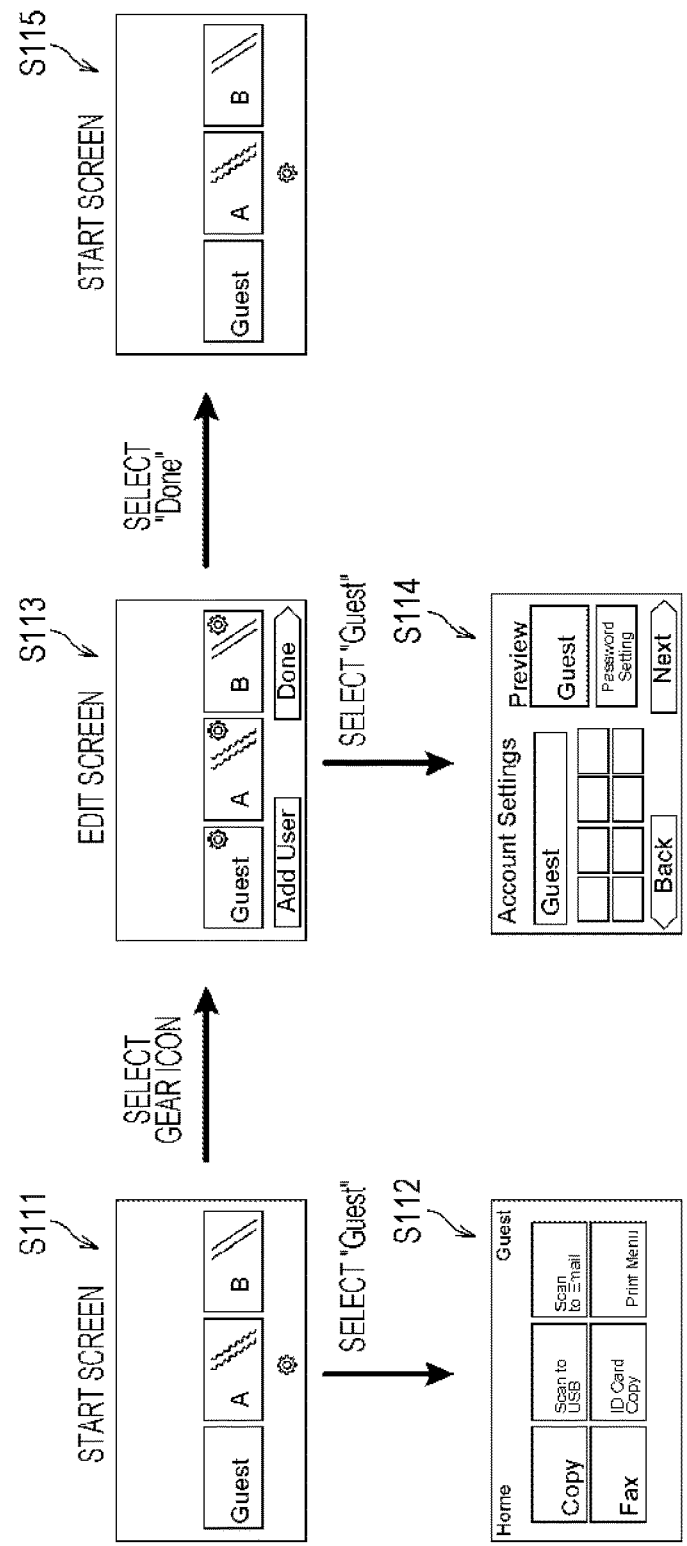

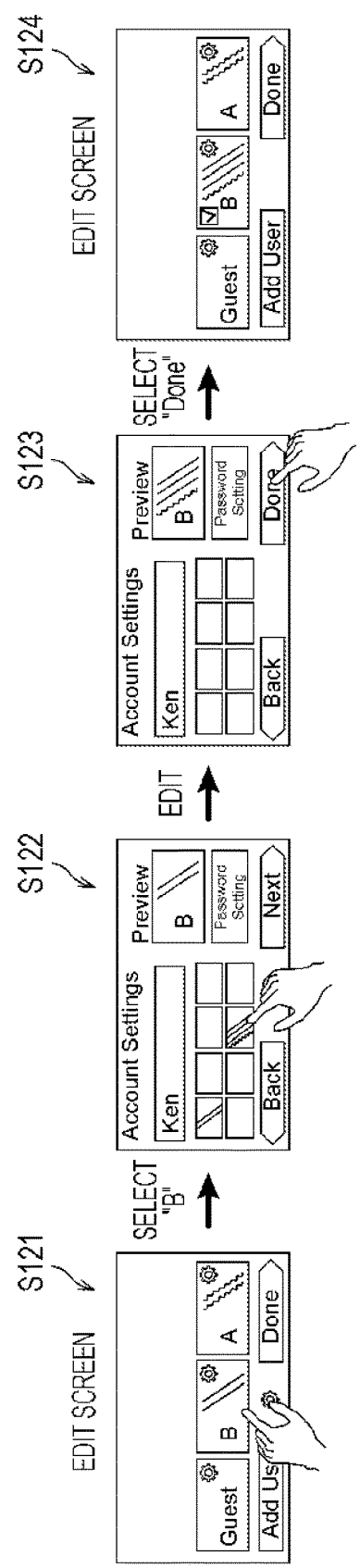

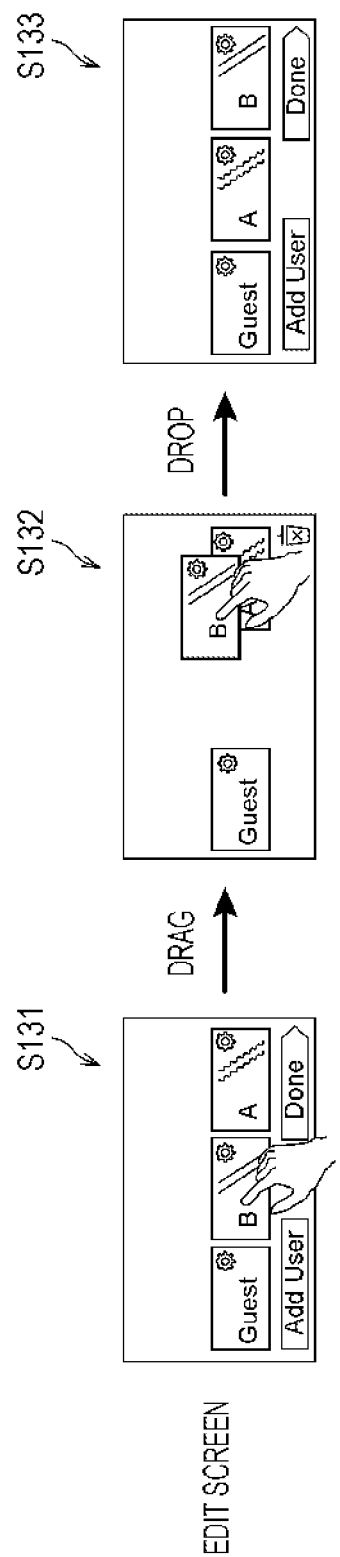

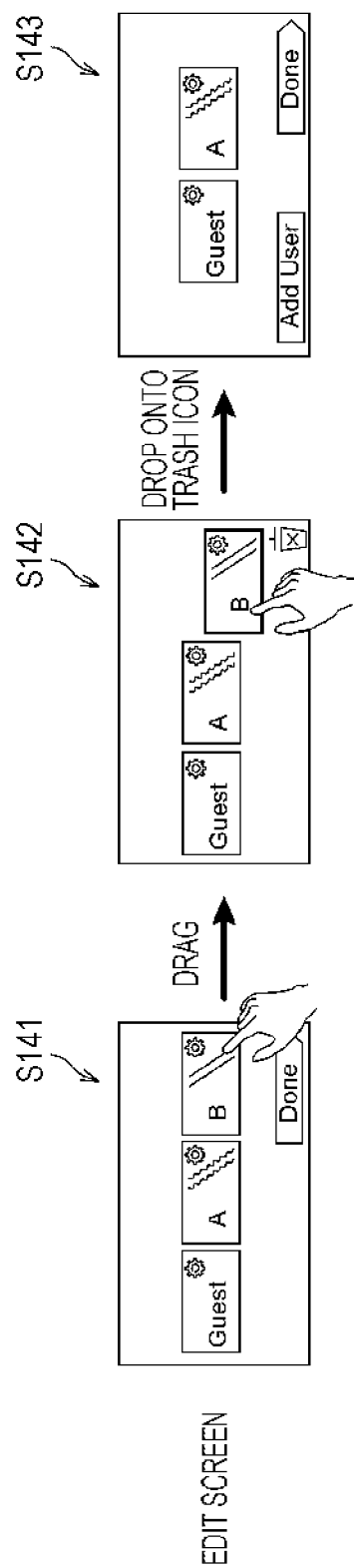

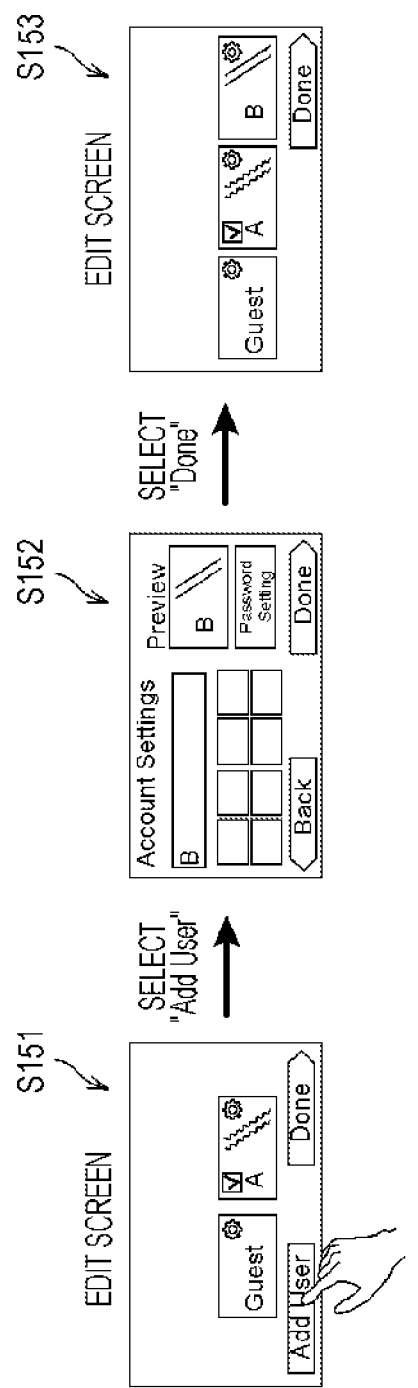

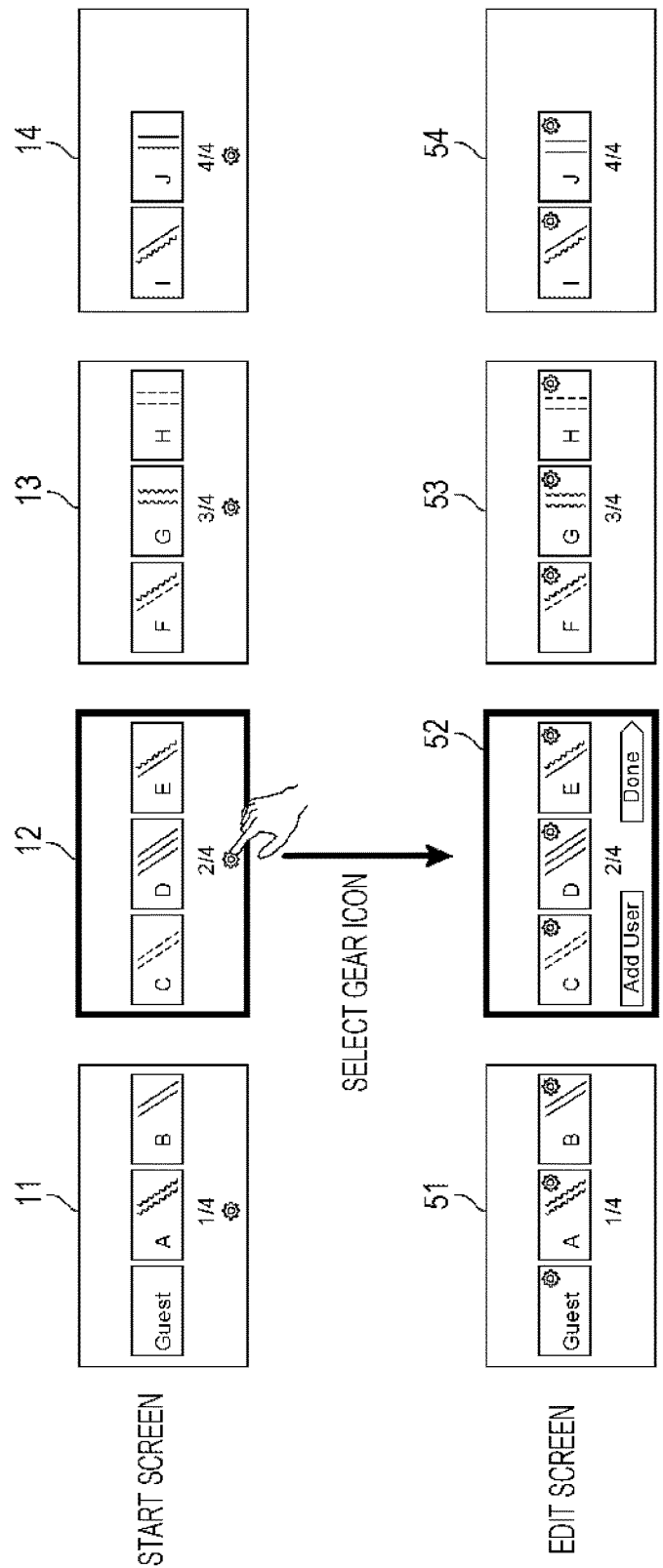

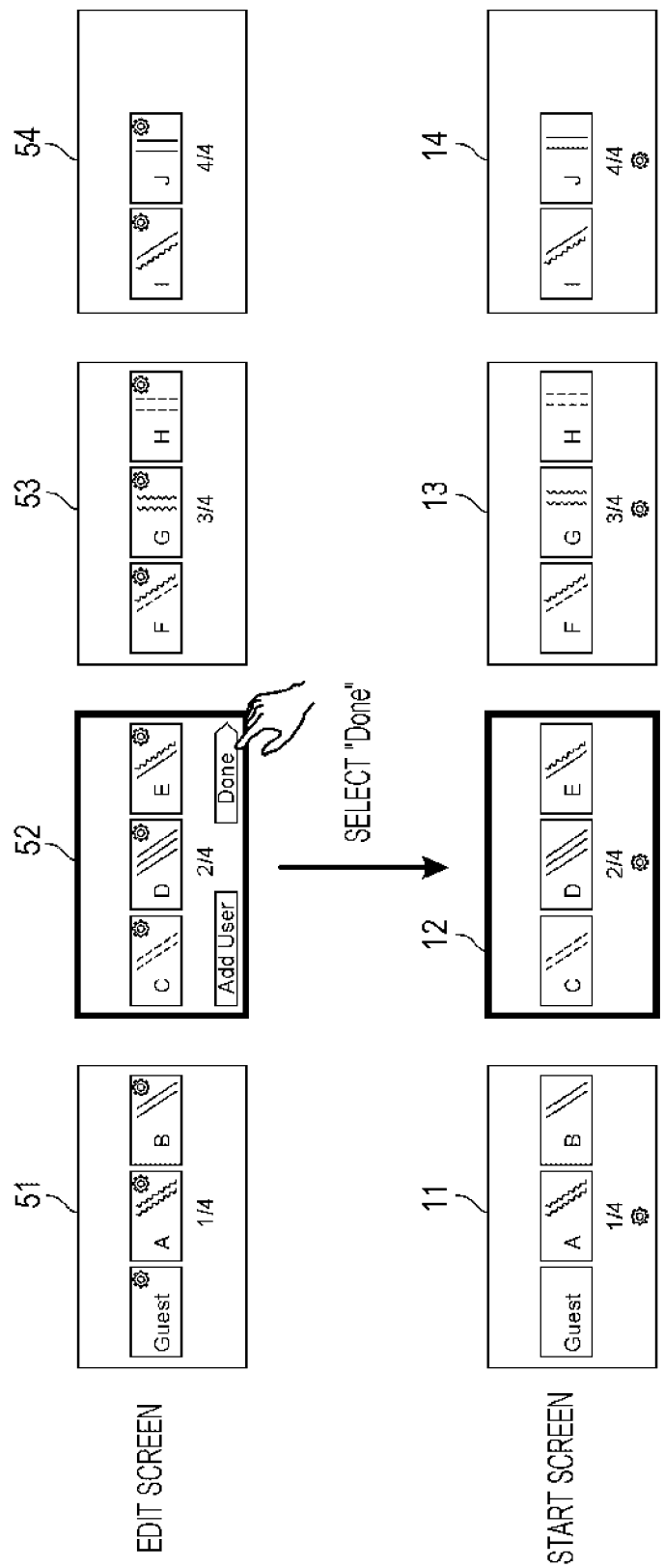

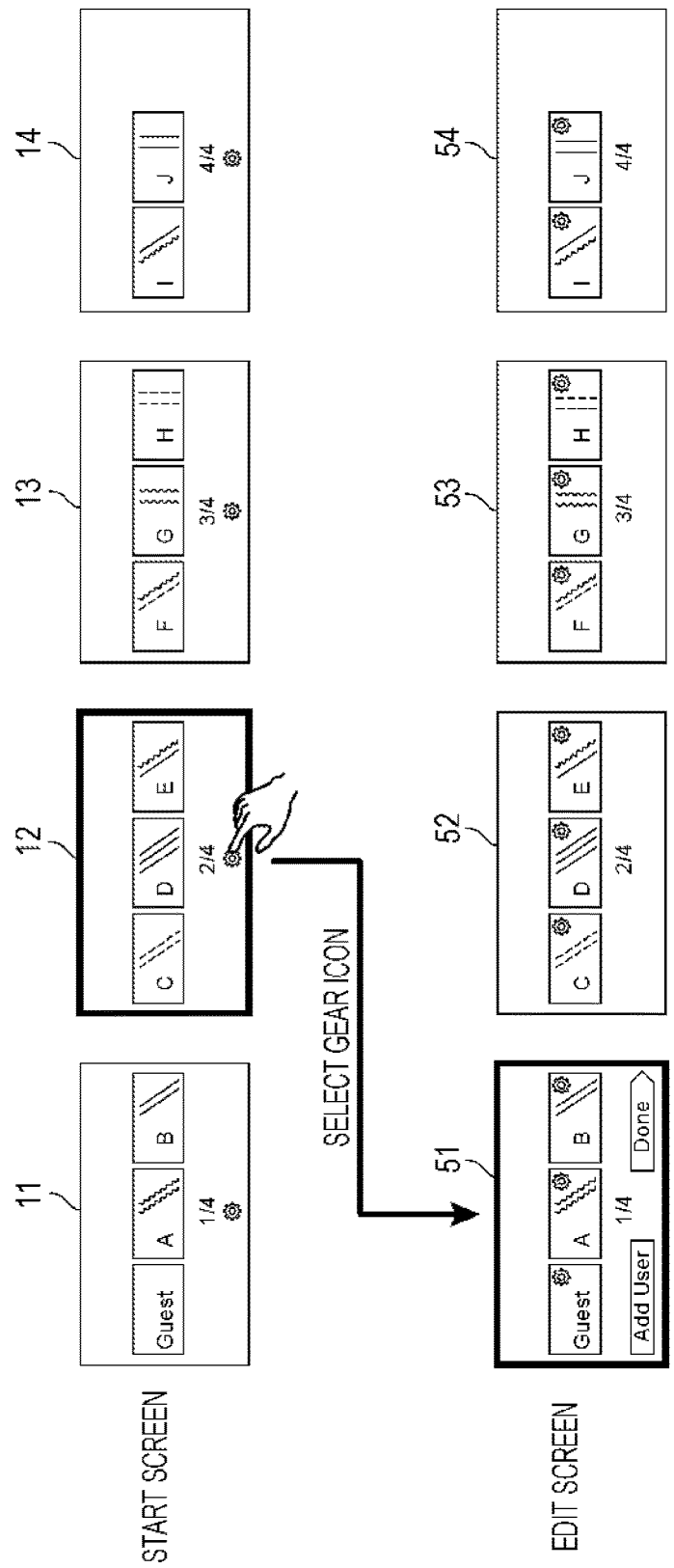

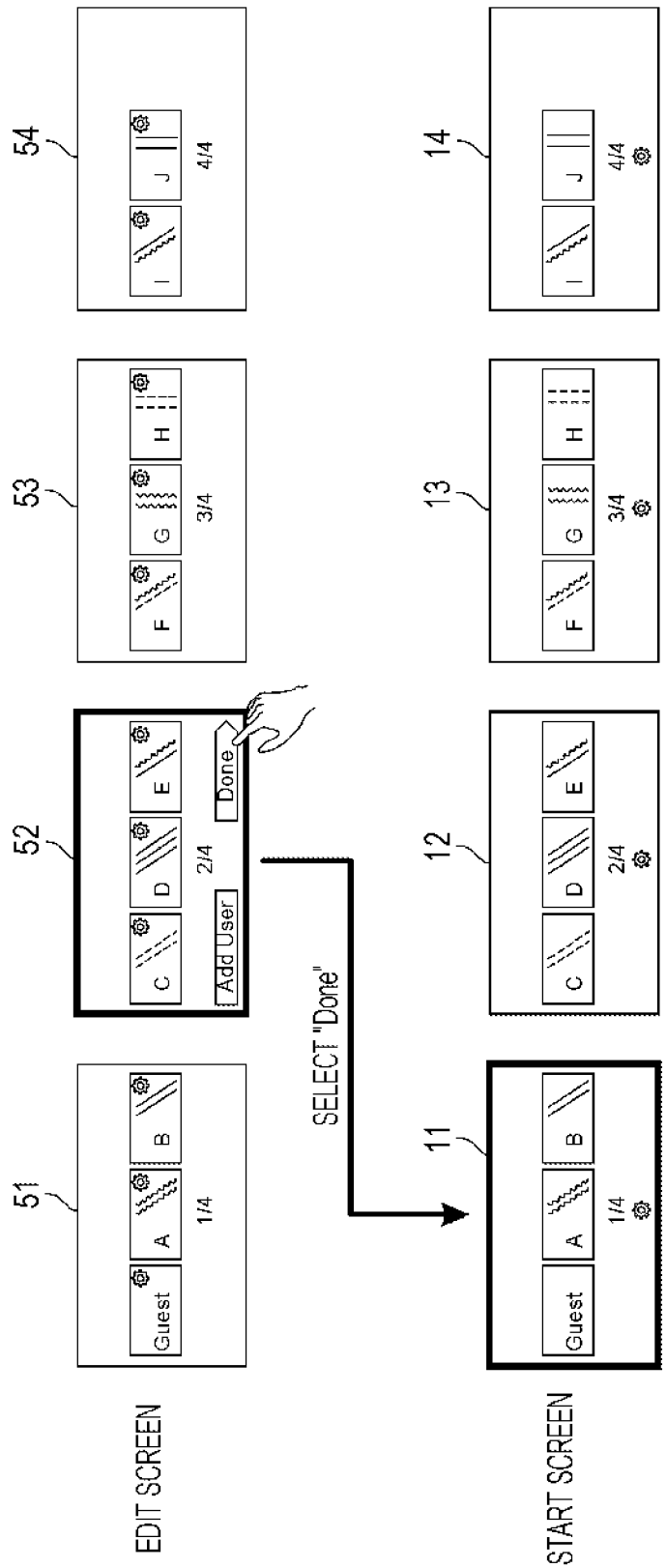

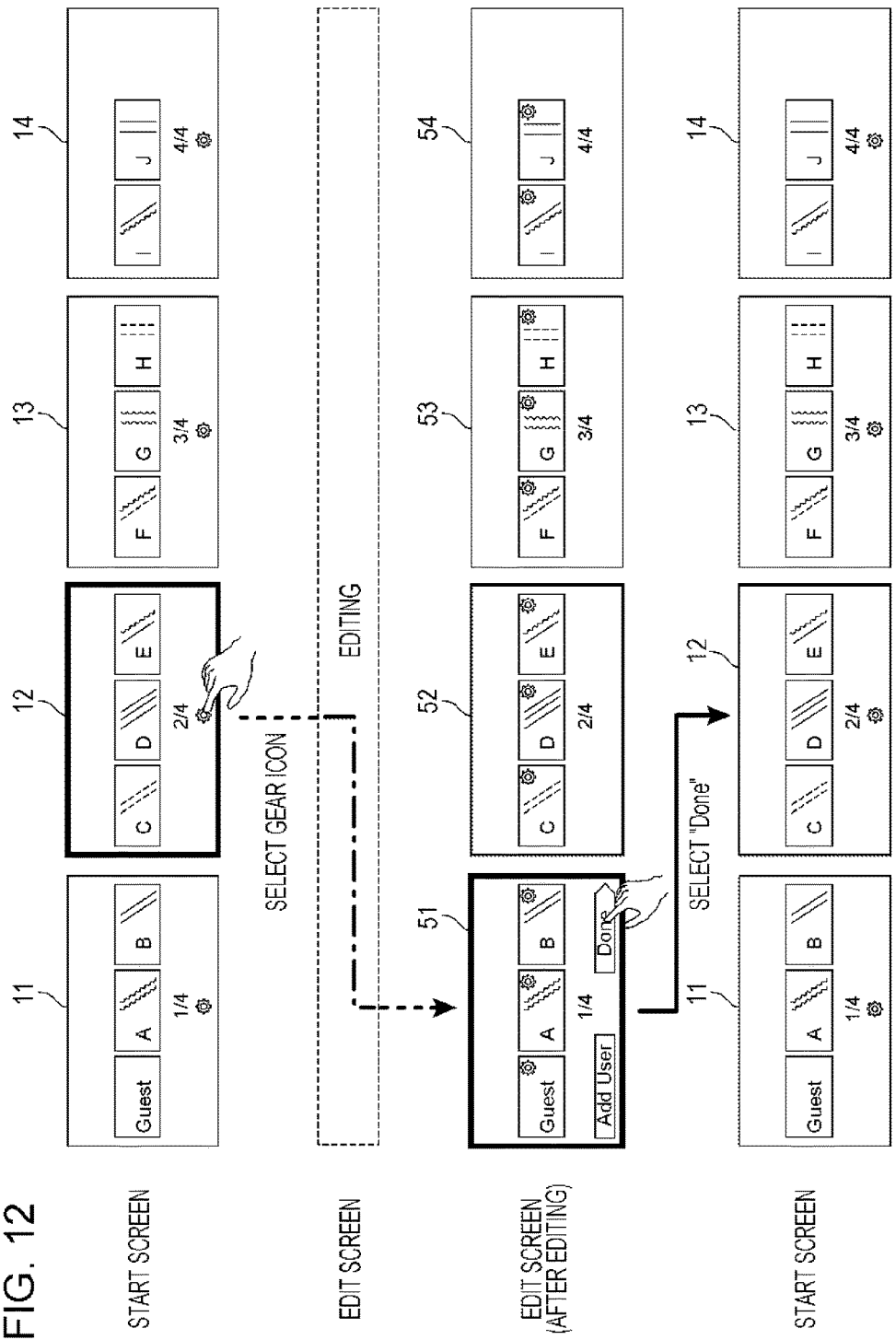

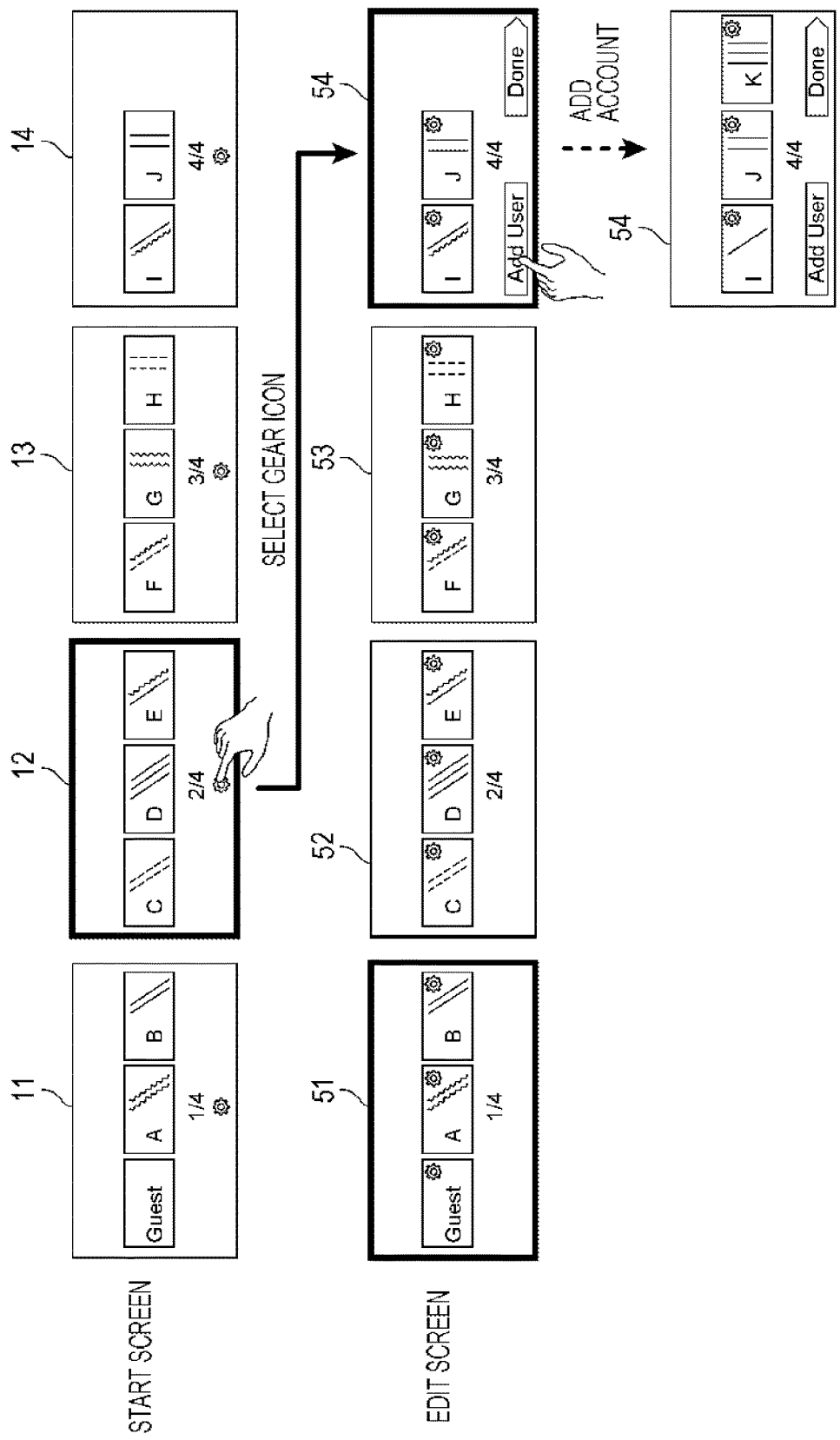

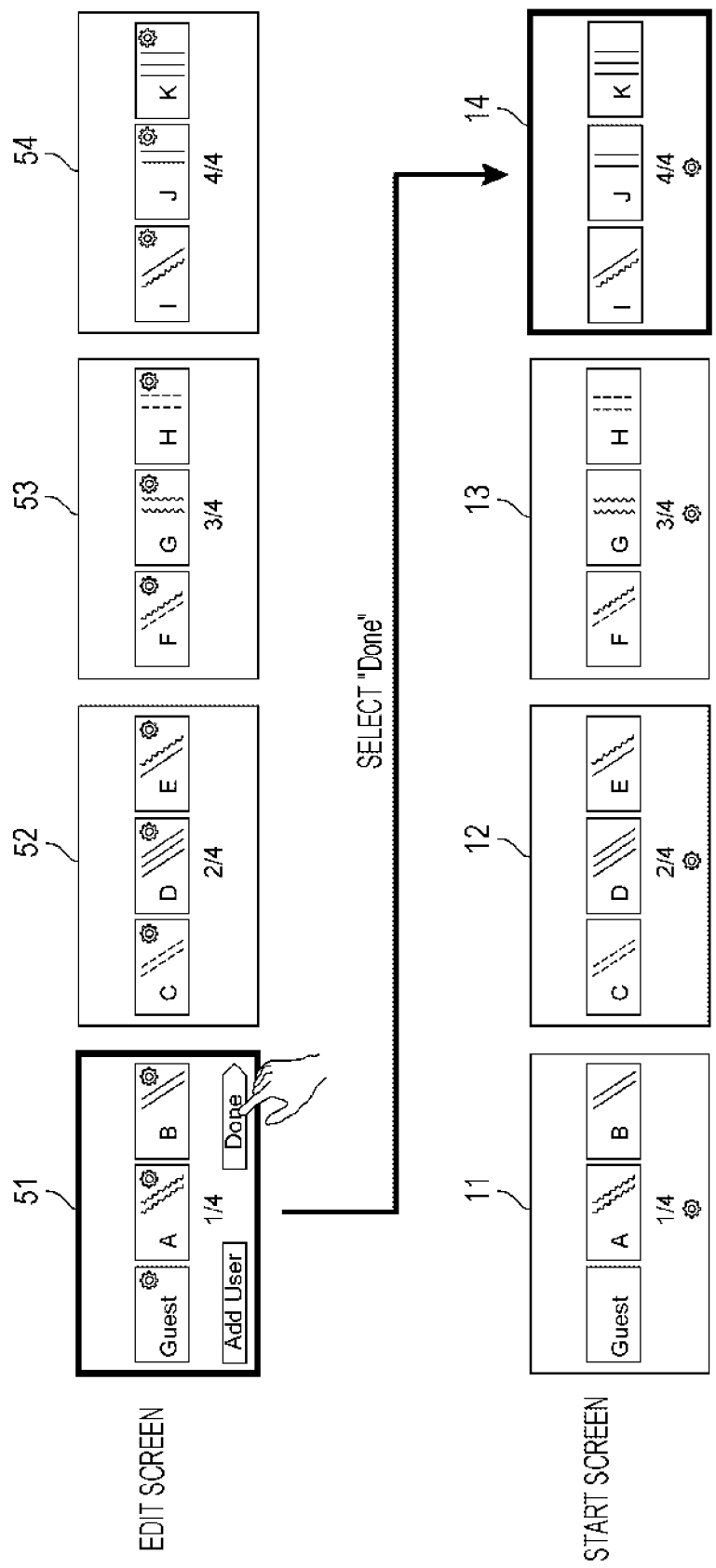

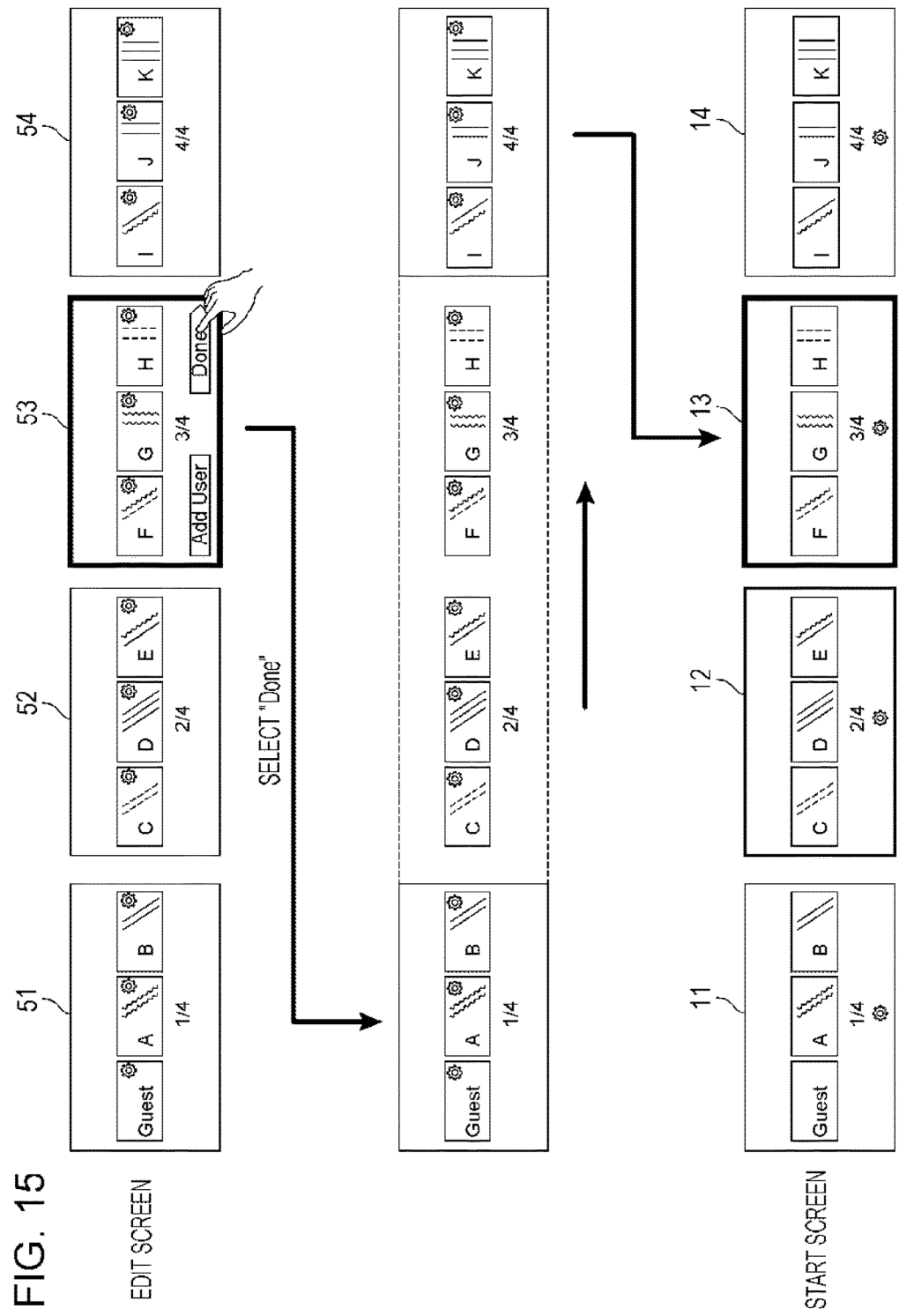

INFORMATION PROCESSING DEVICE, INFORMATION PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2013-150805 filed Jul. 19, 2013 and Japanese Patent Application No. 2013-238671 filed Nov. 19, 2013.

BACKGROUND

Technical Field

The present invention relates to an information processing device, an information processing method, and a computer-readable medium.

SUMMARY

According to an aspect of the invention, there is provided an information processing device that includes a first output unit and a second output unit. The first output unit displays a start screen including a first image for giving an instruction for switching to a screen corresponding to a user, and a second image for giving an instruction for switching to an edit screen. If the second image is selected, the second output unit outputs an edit screen including, in the same arrangement as the first image, a third image for switching to a screen for editing the screen corresponding to a user. Herein, when transitioning to the edit screen, a screen that authenticates an account or the like may be displayed before the edit screen is displayed.

BRIEF DESCRIPTION OF THE DRAWINGS

An exemplary embodiment of the present invention will be described in detail based on the following figures, wherein:

FIG. 3 is a diagram for describing specific screen transitions in an information system provided by the information processing device in FIG. 1;

FIG. 4 is a diagram illustrating screen transitions for account editing;

FIG. 5 is a screen transition diagram illustrating an account identification image rearrangement process on an edit screen;

FIG. 6 is a screen transition diagram illustrating an account removal process on an edit screen;

FIG. 7 is a screen transition diagram illustrating an account adding process on an edit screen;

FIG. 8 is a diagram illustrating one configuration of a transition from a start screen to an edit screen;

FIG. 9 is a diagram illustrating one configuration of a transition from an edit screen to a start screen;

FIG. 10 is a diagram illustrating one configuration of a transition from a start screen to an edit screen;

FIG. 11 is a diagram illustrating one configuration of a transition from an edit screen to a start screen;

FIG. 12 is a diagram illustrating one configuration of a transition from a start screen to an edit screen and back to a start screen;

FIG. 13 is a diagram illustrating one configuration of a transition from a start screen to an edit screen;

FIG. 14 is a diagram illustrating one configuration of a transition from an edit screen to a start screen; and FIG. 15 is a diagram illustrating one configuration of a transition from an edit screen to a start screen.

DETAILED DESCRIPTION

Figure 1:
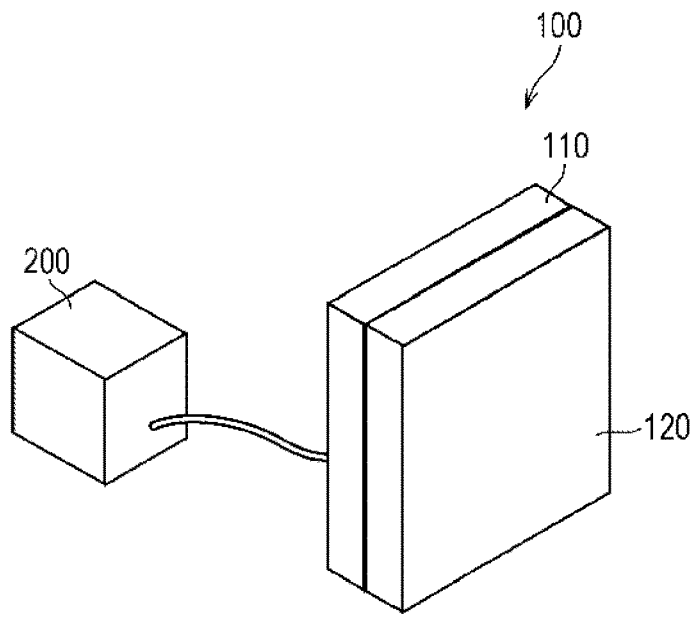
FIG. 1 is a diagram illustrating an information processing system according to an exemplary embodiment of the present invention.

FIG. 1 illustrates an information processing system 100 according to an exemplary embodiment of the present invention. As illustrated in FIG. 1, the information processing system 100 includes an information processing device 200, a display device 110, and a touch panel 120. The information processing device 200 includes a central processing unit (CPU), random access memory (RAM), and a magnetic disk device or the like, and processes digital information. The display device 110 is a liquid crystal display device or the like that displays image information output from the information processing device 200. The touch panel 120 includes a transparent substrate overlaid onto the display face of the display device 110 and transparent electrode leads formed on the transparent substrate, and a result of being touched by a user's finger or the like, detects and outputs the touched coordinates to the information processing device 200.

Although the display device herein is taken to be a liquid crystal display device, an organic electroluminescence (EL) display device or other display device that displays an image is also acceptable. Also, although the input device is taken to be a touch panel, another input device such as a mouse or keyboard is also acceptable. Although the information processing device 200 is configured to directly connect to the display device 110 and the touch panel 120, an information processing device 200 that functions as a server or the like on a network such as the Internet is also acceptable. In this case, information such as the image information displayed on the display device 110 and the input information may be transmitted and received via an information communication device (not illustrated). In this case, the information processing device 200 may be multiple devices connected to a network.

The information processing system 100 herein is a device enabling multiple users to utilize an information system by using a respective account for each user. For example, the information processing system 100 may be a multi-function device having printer and copier functions installed in an office, an employee management system, a client or member management system, or the like.

Figure 2:
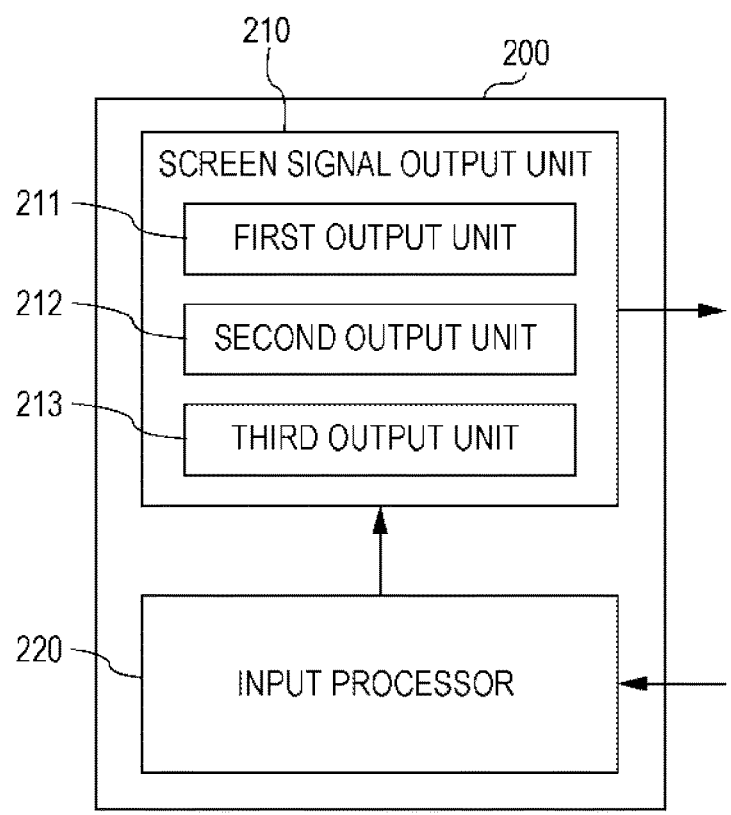
FIG. 2 is a block diagram illustrating a functional configuration of the information processing device in FIG. 1.

FIG. 2 is a block diagram illustrating a functional configuration of the information processing device 200. As illustrated in FIG. 2, the information processing device 200 is equipped with a screen signal output unit 210 and an input processor 220. The screen signal output unit 210 outputs a screen signal, which is a signal causing the display of a screen on the display device 110. The input processor 220 accepts coordinates input by the touch panel 120 as input, processes information on the basis of the screen being displayed on the screen signal output unit 210 and the input coordinates, and issues output instructions for the next screen to be displayed on the display device 110.

In addition, the screen signal output unit 210 includes a first output unit 211, a second output unit 212, and a third output unit 213. The first output unit 211 outputs a signal for displaying a start screen, on which are arranged identification images (first images) for each account, and which waits for the input of start instructions for a process for each account, or start instructions for an account managing/editing process. In the case of receiving start instructions for an account managing/editing process while the start screen is being displayed, the second output unit 212 outputs a signal for displaying an edit screen, on which the arrangement of per-account managing/editing identification images (third images) is the arrangement of identification images on the start screen. In the case of receiving move instructions for moving to the start screen while on the edit screen, the third output unit 213 outputs a signal that successively displays all account identification images or managing/editing identification images. Note that although the third output unit 213 is included in the present exemplary embodiment, a configuration that does not include the third output unit 213 is also acceptable. Herein, an account is a right for a user to log in to a service provided by the information processing device 200. Identification images for users having login rights are arranged and displayed.

Note that these functions are realized by a CPU executing a program saved in a storage device such as the magnetic disk storage device of the information processing device 200. The program herein may also be provided by being stored on another storage medium such as CD-ROM.

FIG. 3 is a diagram for describing specific screen transitions in an information system provided by the information processing device 200 according to the present exemplary embodiment. As illustrated in FIG. 3, first, an identification image for each user holding an account with the information system is displayed on a start screen (S111). A gear image (second image) for giving instructions to switch to an edit screen is illustrated. Note that the three account names "Guest", "A", and "B" are illustrated on the start screen, and the respective account names are displayed attached to the respective identification images.

At this point, in the case in which a user uses a finger or the like to touch the identification image that includes "Guest" on the touch panel 120, coordinate information is transmitted to the information processing device 200, and after processing by the input processor 220, the screen signal output unit 210 switches to a screen corresponding to a user related to "Guest" (S112). Herein, a screen corresponding to a user means a screen whose displayed content may be made to differ for each user as a result of the corresponding user setting up frequently used functions for easy access or the like. For example, in the case in which the information processing system 100 is a multi-function device having printer and copier functions, multiple service tiles, which are images indicating services such as faxing or copying, may be arranged on the screen, and the arrangement of service tiles or the service tiles to be displayed on the initial screen may be modified for each user. A user is able to move to an activation screen for each service by selecting a service tile related to a desired service. In addition, service tiles may be added, removed, or rearranged on this screen. Also, if the gear image representing editing is touched on the start screen, the second output unit 212 of the screen signal output unit 210 outputs an edit screen (S113). On the edit screen, managing/editing identification images are arranged in the same arrangement as the identification images on the start screen. Herein, the same arrangement means that when switching from the start screen to the edit screen, there is no change in size between the identification images on the start screen and the managing/editing identification images, and also no change in the arrangement order of the identification images for user accounts. In the present exemplary embodiment, a managing/editing identification image is an image in which a gear image (second image) indicating that editing is in progress is attached at the upper-right of an identification image that is the same image as an identification image on the start screen. Herein, attaching a gear image also includes resizing and attaching. As a result, each user is able to visually and easily understand that the screen has switched to a managing/editing screen. Consequently, since an edit screen with the same displayed layout as the start screen may be displayed with a simpler operation, a user is able to easily comprehend the arrangement of managing/editing identification images, and easily conduct account managing/editing. Note that although an image indicating that managing/editing is in progress, such as a gear image, is attached to each identification image the present exemplary embodiment, the configuration is not limited thereto, and the state of being on an edit screen may also be indicated by another display, such as by placing a separate image indicating that managing/editing is in progress at any position on the edit screen.

On this edit screen, in the case in which the "Guest" managing/editing identification image is touched, the screen signal output unit 210 outputs a screen for managing/editing the "Guest" account (S114). With this managing/editing work for each account, it is possible to set screens corresponding to users. For example, editing work such as changing an identification image, setting a password, and changing the account name to display is included. On the other hand, in the case in which the "Done" image is touched (selected) on the edit screen, the display switches back to the start screen again (S115). Besides switching to "a screen corresponding to a user" after making a selection on the "edit screen", the display may also switch to "a screen corresponding to a user" after the screen in S114 is displayed and edited. Specifically, "a screen corresponding to a user" may be displayed after pressing "Next" in S114. Also, switching to "a screen corresponding to a user" or switching to the screen in S114 may be made selectable according to the selected position of the third image on the edit screen.

Note that, although not particularly illustrated in the present exemplary embodiment, a process of authenticating a user may also be conducted when switching from the start screen to the edit screen. In this case, the screen signal output unit 210 may additionally output a screen requesting the input of a password or the like.

Next, a process conducted from the edit screen of the present exemplary embodiment will be described. FIG. 4 is a diagram illustrating screen transitions for account editing. First, if the managing/editing identification image of the "B" account is touched on the edit screen (S121), an edit screen for the "B" account is displayed (S122). At this point, if "Done" is touched after performing editing such as changing the identification image, for example (S123), the edit screen is output again (S124). At this point, an image which is smaller than the managing/editing identification image and which indicates that editing is finished is attached to the upper-left of the managing/editing identification image of the "B" account. As a result, it is possible to check which accounts have been edited, and prevent duplicate editing or missed editing.

FIG. 5 is a screen transition diagram illustrating an account identification image rearrangement process on an edit screen. As illustrated in FIG. 5, first, on the edit screen (S131), the managing/editing identification image of the account "B" is dragged (S132). By dropping the managing/editing identification image of the account "B" upon reaching a desired position, the arrangement of managing/editing identification images may be modified (S133).

FIG. 6 is a screen transition diagram illustrating an account removal process on an edit screen. As illustrated in FIG. 6, first, on the edit screen (S141), if the managing/editing identification image of the account "B" is dragged similarly as in FIG. 5, a trashcan image is displayed in the lower-right of the screen (S142). By dropping the managing/editing identification image of the account "B" onto the position of the trashcan image at this point, the account related to the dropped managing/editing identification image is deleted (S143).

FIG. 7 is a screen transition diagram illustrating an account adding process on an edit screen. As illustrated in FIG. 7, first, "Add User" is touched on the edit screen (S151), and similarly to editing an account, an account display name and password are input or an identification image is selected, and relevant content is input (S152). By subsequently touching "Done", the addition of an account is completed (S153).

FIGS. 8 to 15 are diagrams for describing switching between the start screen and the edit screen in an example in which the account identification images on the start screen are arranged over four screens. Page numbers 1/4, 2/4, 3/4 and 4/4 are assigned to the respective screens in FIGS. 8 to 15, and these screens will be respectively referred to as the first start screen 11, the second start screen 12, the third start screen 13, and the fourth start screen 14 on the start screen, and as the first edit screen 51, the second edit screen 52, the third edit screen 53, and the fourth edit screen 54 on the edit screen. Note that although the present exemplary embodiment illustrates an example in which three identification images are arranged per screen with the identification images being arranged over four screens, the number of identification images arranged per screen and the number of screens over which the identification images are arranged may be appropriately modified according to a setting or the number of registered accounts.

FIG. 8 is a diagram illustrating one configuration of a transition from a start screen to an edit screen. As illustrated in FIG. 8, when a gear image meaning editing is touched (selected) on the second start screen 12 and instructions are given for starting a process of account managing/editing, the second output unit 212 outputs a signal displaying the second edit screen 52, on which the arrangement of managing/editing identification images corresponds to the arrangement of identification images on the second start screen 12. In other words, even in the case of switching from the start screen to the edit screen, there is displayed an edit screen on which are arranged managing/editing identification images for the same accounts as the identification images displayed on the start screen at the time of the switch. As discussed earlier, when switching from the start screen to the edit screen, there is no change in size between the identification images on the start screen and the managing/editing identification images, and also no change in the arrangement order of the identification images for user accounts. Also, a gear image indicating that editing is in progress is attached to the managing/editing identification images. Consequently, since an edit screen with the same displayed layout as the start screen may be displayed with a simpler operation, a user is able to easily comprehend the arrangement of managing/editing identification images, and easily conduct account managing/editing.

FIG. 9 is a diagram illustrating one configuration of a transition from an edit screen to a start screen. As illustrated in FIG. 9, when the instruction "Done" for moving to the start screen is selected on the second edit screen 52, the first output unit 211 outputs a signal displaying the second start screen 12, on which the arrangement of identification images corresponds to the arrangement of managing/editing identification images on the second edit screen 52. In other words, even in the case of switching from the edit screen to the start screen, there is displayed a start screen on which are arranged identification images for the same accounts as the managing/editing identification images displayed on the edit screen at the time of the switch. In other words, when switching from the edit screen to the start screen, there is no change in size between the managing/editing identification images and the identification images on the start screen, and also no change in the arrangement order of the identification images for user accounts. Meanwhile, the identification images displayed on the start screen differ from the managing/editing identification images in that the gear image indicating that editing is in progress is removed. Consequently, since a start screen with the same displayed layout as the edit screen may be displayed with a simpler operation, a user is able to easily comprehend the arrangement of identification images, and perform work from the start screen.

FIG. 10 is a diagram illustrating one configuration of a transition from a start screen to an edit screen. As illustrated in FIG. 10, when instructions are given for starting a process of account managing/editing by selecting the gear image on the second start screen 12, the second output unit 212 outputs a signal displaying the first edit screen 51, which is the first of four screens. In other words, in the case of switching from the start screen to the edit screen, the first edit screen from among multiple edit screens is displayed. Consequently, a user is able to easily recognize that the display has transitioned to the edit screen.

FIG. 11 is a diagram illustrating one configuration of a transition from an edit screen to a start screen. As illustrated in FIG. 11, when the instruction "Done" for moving to the start screen is selected on the second edit screen 52, the first output unit 211 outputs a signal displaying the first start screen 11, which is the first of four screens. In other words, in the case of switching from the edit screen to the start screen, the first start screen from among multiple start screens is displayed. Consequently, a user is able to easily recognize that the display has transitioned to the start screen.

FIG. 12 is a diagram illustrating one configuration of a transition from a start screen to an edit screen and back to a start screen. As illustrated in FIG. 12, assume that instructions are given for starting a process of account managing/editing by selecting the gear image on the second start screen 12, account editing work is performed on one of the edit screens, and finally, the instruction "Done" for moving to the start screen is selected on the first edit screen 51. In this case, the first output unit 211 outputs a signal displaying the second start screen 12, which is the start screen on which the instruction for starting the process of account managing/editing was received. In other words, in the case of switching from the edit screen to the start screen, the start screen from among multiple start screens that was being displayed when the instruction to switch to the edit screen is displayed. Consequently, a user is able to easily recognize that the display has transitioned to the start screen, and is able to continue the original work on the start screen after the transition.

FIG. 13 is a diagram illustrating one configuration of a transition from a start screen to an edit screen. As illustrated in FIG. 13, when instructions are given for starting a process of account managing/editing by selecting the gear image on the second start screen 12, the second output unit 212 outputs a signal displaying the fourth edit screen 54 that is the last of four screens. In other words, in the case of switching from the start screen to the edit screen, the last edit screen from among multiple edit screens is displayed. Subsequently, in the case of adding an account by selecting "Add User", the managing/editing identification image of the new account is added to the fourth edit screen 54. Consequently, a user is able to easily recognize that the display has transitioned to the edit screen, perform the work of adding an account on a screen to which an account is added without a screen transition, and edit the added account without a screen transition.

FIG. 14 is a diagram illustrating one configuration of a transition from an edit screen to a start screen. As illustrated in FIG. 14, when the instruction "Done" for moving to the start screen is selected on the second edit screen 52, the first output unit 211 outputs a signal displaying the fourth start screen 14, which is the start screen from among the four screens on which an identification image for a newly added account is placed. In other words, in the case of switching from the edit screen to the start screen, the start screen displaying the identification image of an added account is displayed from among multiple start screens. Consequently, a user is able to easily recognize the screen to which the added account has been added. Note that in the present exemplary embodiment, a new account is added to the last start screen, that is, the fourth of four start screens. However, a new account may also be added to another start screen, and in this case the start screen that displays the added account is displayed.

FIG. 15 is a diagram illustrating one configuration of a transition from an edit screen to a start screen. As illustrated in FIG. 15, when the instruction "Done" for moving to the start screen is selected on the third edit screen 53, before the first output unit 211 outputs a screen, the third output unit 213 outputs a signal that successively displays managing/editing identification images for all accounts. After that, the first output unit 211 outputs a signal displaying the third start screen 13, on which the arrangement of identification images corresponds to the arrangement of managing/editing identification images on the third edit screen 53. In other words, all account images are displayed before the start screen is displayed when switching from the edit screen to the start screen. Consequently, a user is able to easily check all accounts when transitioning from the edit screen to the start screen.

Although the images displayed by the third output unit 213 at this point successively output the first edit screen 51 to the fourth edit screen 54, images displaying managing/editing identification images successively flowing by, or images output as a list of registered managing/editing identification images is also acceptable. In addition, although the images displayed by the third output unit 213 in the present exemplary embodiment are taken to be the managing/editing identification images, the identification images displayed on the start screen are also acceptable. Furthermore, although all account images are displayed, a portion of the account images is also acceptable, such as only the images of accounts included in a certain group. Also, although the screen output by the first output unit 211 is taken to be a start screen on which are arranged identification images for the same accounts as the managing/editing identification images displayed on the edit screen at the time of the switch, similarly to the example in FIG. 9, another start screen may also be displayed according to another example, such as FIG. 11 or FIG. 14.

As described above, according to the present exemplary embodiment, a user moves from a start screen to a screen for conducting account managing/editing having an easily understood screen layout, and once again easily returns to the start screen. Consequently, account managing/editing may be conducted easily.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a processor configured to execute instructions configured to:
display a start screen including a first image for giving an instruction for switching to a screen corresponding to a user, and a second image for giving an instruction for switching to an edit screen;
output, after the second image is selected, an edit screen including, in the same arrangement as the first image, a third image for switching to a screen for editing the screen corresponding to a user; and
successively output, when a switch instruction for switching to the start screen is received while one of a plurality of edit screens is being displayed, the first image or the third image for all users before outputting the start screen.

2. The information processing device according to claim 1, wherein
the third image is an image of the second image attached to the first image.

3. The information processing device according to claim 1, wherein the processor is further configured to execute instructions configured to:
after an instruction for switching to the edit screen is received, output the edit screen having an arrangement of the third image that corresponds to an arrangement of the first image on the start screen that was being displayed when the instruction for switching to the edit screen was received, and
after a switch instruction for switching to the start screen is received, output the start screen having an arrangement of the first image that corresponds to an arrangement of the third image on the edit screen that was being displayed when the switch instruction was received.

4. The information processing device according to claim 1, wherein the processor is further configured to execute instructions configured to:
when an instruction for switching to the edit screen is received, output the edit screen that is first of a plurality of edit screens.

5. The information processing device according to claim 1, wherein the processor is further configured to execute instructions configured to:
after the switch instruction for switching to the start screen is received while one of a plurality of edit screens is being displayed and the first image or the third image has been output for all users, output the start screen that is first of a plurality of start screens.

6. The information processing device according to claim 1, wherein the processor is further configured to execute instructions configured to:
after the switch instruction for switching to the start screen is received while one of a plurality of edit screens is being displayed and the first image or the third image has been output for all users, output the start screen that received the instruction for switching to the edit screen.

7. The information processing device according to claim 1, wherein the processor is further configured to execute instructions configured to:
after an instruction for switching to the edit screen is received, output the edit screen that is last of a plurality of edit screens.

8. The information processing device according to claim 1, wherein the processor is further configured to execute instructions configured to:
after the switch instruction for switching to the start screen is received while one of a plurality of edit screens is being displayed and the first image or the third image has been output for all users, if a user has been added since the start screen was last displayed but before the instruction is received, output the start screen having arranged thereon the first image of the added user.

9. The information processing device according to claim 1, wherein the processor is further configured to execute instructions configured to:
when outputting the edit screen after finishing an editing process for a user, output the edit screen having part of the third image related to the user that was subjected to the editing process substituted with an image which is smaller than the third image and which indicates that editing is finished.

10. The information processing device according to claim 1, wherein
the third image is the same image as the first image, and an image indicating that the edit screen is being displayed is arranged on the edit screen at a position different from a position at which the third image is arranged.

11. The information processing device according to claim 1, wherein
the same arrangement means that when switching from the start screen to the edit screen, there is no change in size between the first image on the start screen and the third image.

12. The information processing device according to claim 1, wherein
the first image comprises a plurality of identification images, each identification image corresponding to a different user,
the third image comprises a plurality of managing images, each managing image corresponding to a different user, and
the same arrangement means that, when switching from the start screen to the edit screen, there is no change in size between the plurality of identification images on the start screen and the plurality of managing images, and also that there is no change in the arrangement order of the identification images for user accounts.

13. An information processing device comprising:
a processor configured to execute instructions configured to:
display a start screen including a first image for giving an instruction to switch to a screen corresponding to a user, and a second image for giving an instruction for switching to an edit screen;
output, after the second image is selected, an edit screen that includes a third image for switching to a screen for editing the first image, or to a screen for editing an arrangement of the first image, and on which an arrangement position of the third image is the same as an arrangement position of the first image; and
successively output, when a switch instruction for switching to the start screen is received while one of a plurality of edit screens is being displayed, the first image or the third image for all users before the first output unit outputs the start screen.

14. The information processing device according to claim 13, wherein
the same arrangement means that when switching from the start screen to the edit screen, there is no change in size between the first image on the start screen and the third image.

15. An information processing method comprising:
displaying a start screen including a first image for giving an instruction for switching to a screen corresponding to a user, and a second image for giving an instruction for switching to an edit screen;
if the second image is selected, outputting an edit screen including, in the same arrangement as the first image, a third image for switching to a screen for editing the screen corresponding to a user; and
when a switch instruction for switching to the start screen is received while one of a plurality of edit screens is being displayed, displaying the first image or the third image for all users before the first output unit outputs the start screen.

16. The information processing method according to claim 15, wherein
the same arrangement means that when switching from the start screen to the edit screen, there is no change in size between the first image on the start screen and the third image.

17. A non-transitory computer readable medium storing a program causing a computer to execute a process for processing information, the process comprising:
displaying a start screen including a first image for giving an instruction for switching to a screen corresponding to a user, and a second image for giving an instruction for switching to an edit screen;
if the second image is selected, outputting an edit screen including, in the same arrangement as the first image, a third image for switching to a screen for editing the screen corresponding to a user; and
when a switch instruction for switching to the start screen is received while one of a plurality of edit screens is being displayed, displaying the first image or the third image for all users before the first output unit outputs the start screen.

18. The non-transitory computer readable medium method according to claim 17, wherein
the same arrangement means that when switching from the start screen to the edit screen, there is no change in size between the first image on the start screen and the third image.

* * * * *